US007047530B2

(12) United States Patent
Lu

(10) Patent No.: US 7,047,530 B2
(45) Date of Patent: May 16, 2006

(54) METHOD AND SYSTEM FOR CROSS PLATFORM, PARALLEL PROCESSING

(75) Inventor: Yen Lu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 10/093,459

(22) Filed: Mar. 7, 2002

(65) Prior Publication Data

US 2002/0147855 A1 Oct. 10, 2002

(30) Foreign Application Priority Data

Apr. 6, 2001 (CA) .................................. 2343437

(51) Int. Cl.
*G06F 9/46* (2006.01)
(52) U.S. Cl. ...................... 718/102; 717/101; 717/151; 717/160; 710/71; 710/100; 707/7; 713/100; 713/400
(58) Field of Classification Search ........ 718/100–108; 717/155, 157, 108–147, 101–160; 709/223, 709/203; 706/47; 703/13; 710/71, 100; 707/7; 713/100, 400
See application file for complete search history.

(56) References Cited

U.S. PATENT DOCUMENTS

| | | | | |
|---|---|---|---|---|
| 4,750,149 A * | 6/1988 | Miller ........................... | 710/71 |
| 5,088,034 A * | 2/1992 | Ihara et al. ................... | 717/160 |
| 5,179,702 A * | 1/1993 | Spix et al. .................... | 718/102 |
| 5,375,242 A * | 12/1994 | Kumar et al. ................. | 717/147 |
| 5,421,015 A * | 5/1995 | Khoyi et al. ................. | 718/107 |
| 5,640,554 A * | 6/1997 | Take .............................. | 707/7 |
| 5,758,127 A * | 5/1998 | MacAulay et al. ............ | 710/71 |
| 5,778,212 A * | 7/1998 | Dehnert et al. .............. | 717/155 |
| 5,812,855 A * | 9/1998 | Hiranandani et al. ........ | 717/157 |
| 5,850,547 A * | 12/1998 | Waddington et al. ........ | 718/102 |
| 5,978,830 A * | 11/1999 | Nakaya et al. ............... | 718/102 |
| 6,128,681 A * | 10/2000 | Shephard ...................... | 710/71 |
| 6,205,465 B1 * | 3/2001 | Schoening et al. .......... | 718/102 |
| 6,279,025 B1 * | 8/2001 | Yamamoto et al. .......... | 718/100 |
| 6,405,364 B1 * | 6/2002 | Bowman-Amuah .......... | 717/101 |
| 6,424,991 B1 * | 7/2002 | Gish ........................... | 709/203 |
| 6,434,590 B1 * | 8/2002 | Blelloch et al. ............. | 718/102 |
| 6,536,037 B1 * | 3/2003 | Guheen et al. .............. | 717/151 |
| 6,578,153 B1 * | 6/2003 | Sankey et al. ............... | 713/400 |
| 6,587,942 B1 * | 7/2003 | Chiang ........................ | 713/100 |
| 6,606,616 B1 * | 8/2003 | Selzer ......................... | 706/47 |
| 6,701,359 B1 * | 3/2004 | Calabrez et al. ............ | 709/223 |
| 6,857,122 B1 * | 2/2005 | Takeda et al. ............... | 718/107 |
| 6,868,463 B1 * | 3/2005 | Jung et al. ................... | 710/100 |
| 2002/0183997 A1 * | 12/2002 | Powell et al. ................ | 703/13 |
| 2002/0199170 A1 * | 12/2002 | Jameson ...................... | 717/120 |
| 2003/0093769 A1 * | 5/2003 | Kumar ......................... | 717/108 |

* cited by examiner

*Primary Examiner*—Meng-Al T. An
*Assistant Examiner*—Jennifer N To
(74) *Attorney, Agent, or Firm*—Stephen J. Walder, Jr.; Jeffrey S. LaBaw

(57) ABSTRACT

Embodiments of the invention, given a conventional makefile which builds targets in serial mode, will process (e.g., compile, link, pre-process, execute, etc.) commands in parallel on those targets which, as a result of a lack of interdependency, can be built in any order. Embodiments may first identify one or more targets (i.e., object files) which are candidates for parallel compilation ("parallelization"). From the targets identified instructions are generated, which may be stored in a file, which provides the identity of targets for parallelization and the order in which these targets should be built. The instructions may then be executed (resulting in some instructions being executed in parallel) thus providing reduced compiling time and, thus, improving productivity.

38 Claims, 11 Drawing Sheets

METHOD AND SYSTEM FOR CROSS PLATFORM, PARALLEL PROCESSING

FIELD OF THE INVENTION

The present invention relates to processing techniques and, more particularly to a method and system for cross platform, parallel processing.

BACKGROUND OF THE INVENTION

The processing (e.g., compiling) of source code files (i.e., files which are considered, to those skilled in the art, to be "readable") into binary or object files which can be interpreted and executed by a computer system is a well known process. Generally, many source code files will be created by application developers which will be compiled using a compiler and a "make" utility. As a result of compiling the source code files and linking the resulting object files, a usable and executable application can be created.

The make utility typically only recompiles those modules which have been modified since the last compilation. A make utility, which often is incorporated into or is provided with a compiler, references a "makefile" which lists the application modules that are part of a project and associated libraries that must be linked with these modules. Additionally, the makefile may also include special directives that enable certain modules to be compiled differently if required.

Generally, a makefile, which is interpreted by a make utility, follows the following structure or recipe:

target: dependency
<command>

When this structure is interpreted by the make utility, the make utility will execute the "command" whenever the "target" is out of date with respect to the "dependency". As is known in the art, a makefile may contain multiple recipes. For example, with the following makefile "example.mak":

all: target1 target2 . . . targetN
   target1: dependency1
     <command1>
   target2: dependency2
     <command2>
   . . .
   targetN: dependencyN
     <commandN> the make utility will process each of these recipes (1, 2, . . . N) serially (i.e., one after another) starting with the first recipe which corresponds to "target1" and then progressing to "target2" and so on until "targetN" is processed. The instruction "all: target1, target2, . . . targetN" is interpreted by the makefile interpreter to process a chain or series of recipes.

Some makefiles are structured in a slightly different manner due to the use of "macros". A macro is used to assign one or more commands to an assigned macro name. When the macro name is called, the command(s) in the macro are executed from beginning to end. These makefiles which employ macros may be structured in the following manner:

<macro name>=<command(s)>
target: dependency
<macro name><flags><dependencies>

With this latter structure, a make utility will, upon identifying the "macro name" string, invoke the "command(s)" using the "flags" and "dependencies" specified.

As will be appreciated, the complexity and size of many recently developed applications continues to increase. It is not unusual for a complex application to include thousands of separate source code files. Consequently, computer systems required in the development environment (and often in the deployment environment) include multiple processors to handle the increased compilation loads. However, many makefile utilities, created for single processor systems, are unable to effectively harness the power of multiprocessor systems. Consequently, despite having processing power to spare, many conventional makefile utilities executing on a multiprocessor system compile modules serially (i.e., one after another) despite the opportunity to safely compile many modules in parallel (i.e., compile in parallel those modules which are independent of other modules).

Attempts have been made to address this oversight. Notably, some make utilities are available from the GNU organization (www.gnu.org) and from Sun Microsystems that incorporate extensions to allow parallel compilation. However, these solutions tie the makefiles to the particular make utility and, often, a particular platform (a combination of processing architecture and operating system) and/or shell interpreter. As a result, these solutions are not easily adaptable to multiple platforms and often limit developers to a particular make utility and/or shell interpreter.

Accordingly, a method, system and related embodiments for parallel compiling which addresses, at least in part, some of these shortcomings is desired.

SUMMARY OF THE INVENTION

The present invention is directed to a method, system and related embodiments for parallel processing which addresses, at least in part, some of the shortcomings noted above is provided.

Embodiments of the invention, given a conventional make utility which builds targets in serial mode, will compile in parallel those targets which, as a result of a lack of interdependency, can be built in any order. Embodiments may first identify one or more targets (i.e., object files) which are candidates for parallel compilation ("parallelization"). From the targets identified instructions are generated, which may be stored in a file, which provides the identity of targets for parallelization and the order in which these targets should be built. The instructions may then be executed (resulting in some instructions being executed in parallel) thus providing reduced compiling time and, thus, improving productivity.

Embodiments of the invention may be implemented using the Java™ programming language. Consequently, implementations may be independent of the shell and makefile interpreters employed. Other programming languages such as, for example, C, C++ and the like, could also be employed.

Advantageously, embodiments of the invention enable control of the degree of parallel compilation performed. Accordingly, embodiments may more effectively harness the power of those systems with multiple processors while ensuring that embodiments deployed on systems with comparatively fewer processors are not overwhelmed.

Additionally and advantageously, embodiments of the invention are enabled to selectively compile targets in parallel. Accordingly, some targets (e.g., Java source files which have complex dependencies with other source files that may only be partially known) may be selected to be compiled in a serial rather than parallel fashion.

In a further advantage the structure of a text file which, in some embodiments of the invention, stores instructions to be executed for the parallel compilation of identified and selected targets is arranged such that it follows or is similar to the structure of a conventional makefile.

In a further advantage, embodiments of the invention are also applicable to linking, SQL preprocessing, execution of batch files/scripts and other similar types of processing.

In accordance with an aspect of the present invention there is provided a method for processing at least some of a plurality of targets in parallel comprising: buffering a plurality of processing commands, said processing commands corresponding to said plurality of targets, said plurality of targets independent of each other; launching a plurality of processes and threads; for each of said processing commands buffered, executing a processing command in one of said plurality of threads, wherein at least two of said plurality of processing commands are executed in parallel.

In accordance with another aspect of the present invention there is provided an apparatus for processing targets in parallel comprising: a receiver serially receiving a plurality of processing commands from a make utility; a processing facility adapted to: buffer said plurality of processing commands received; launch a plurality of threads; and execute each of said plurality of processing commands, said each of said plurality processing commands executed by one of said plurality of threads; whereby at least two of said plurality of processing commands are executed in parallel.

In accordance with still another aspect of the present invention there is provided a computer readable media storing instructions and data, said instructions and data capable of adapting a computer system to: buffer a plurality of processing commands, said processing commands corresponding to plurality of targets requiring processing, said plurality of targets independent of each other; launch a plurality of processes and threads; for each of said processing commands buffered, execute a processing command in one of said plurality of threads, wherein at least two of said plurality of processing commands are executed in parallel.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

Figure 1:
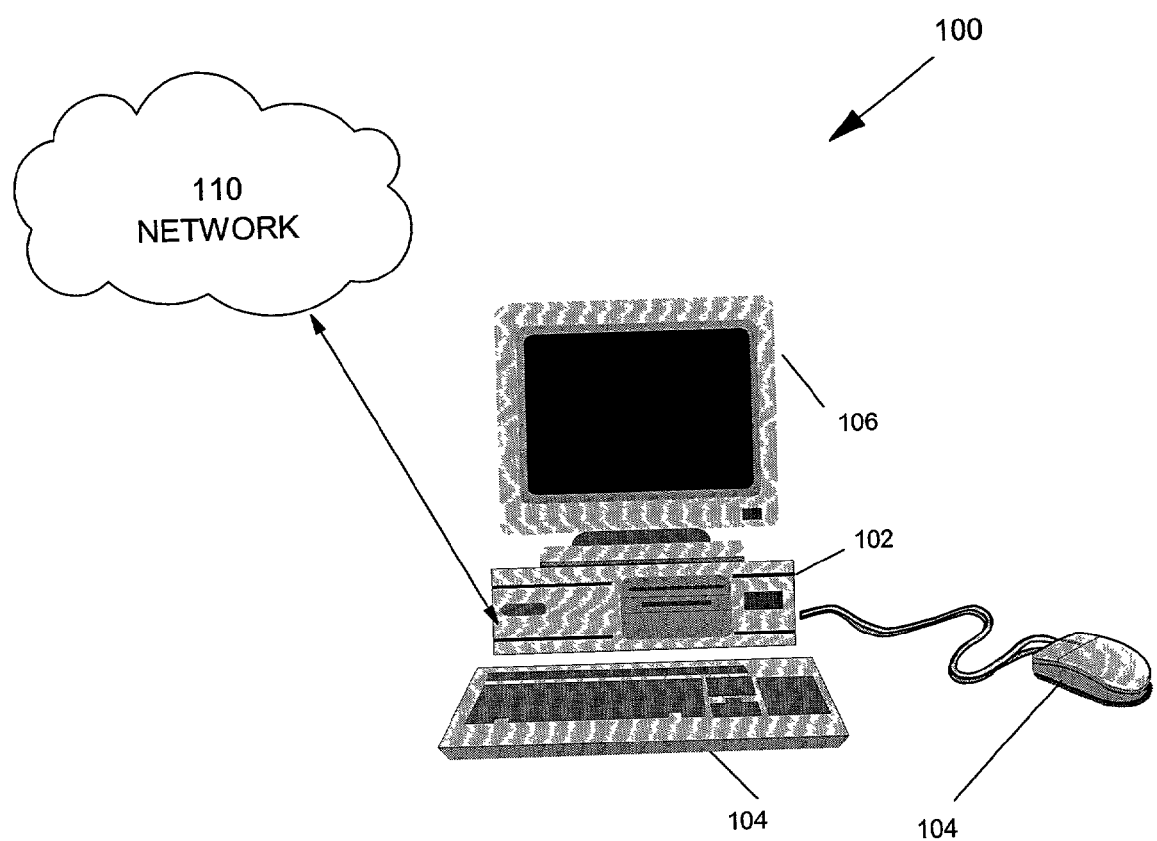
FIG. 1 schematically illustrates a computer system embodying aspects of the invention.

An embodiment of the invention, computer system 100, is illustrated in FIG. 1. Computer system 100, illustrated for exemplary purposes as a networked computing device, is in communication with other networked computing devices (not shown) via network 110. As will be appreciated by those of ordinary skill in the art, network 110 may be embodied using conventional networking technologies and may include one or more of the following: local area networks, wide area networks, intranets, public Internet and the like. As is discussed with reference to FIG. 8, computer system 100 may interact with other networked computer systems (not shown) providing parallel processing.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 110. However, for ease of understanding, aspects of the invention have been embodied in a single computing device—computer system 100.

Computer system 100 includes processing system 102 which communicates with various input devices 104, output devices 106 and network 110. Input devices 104, two of which are shown, may include, for example, a keyboard, a mouse, a scanner, an imaging system (e.g., a camera, etc.) or the like. Similarly, output devices 106 (only one of which is illustrated) may include displays, information display units, printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

Figure 2:
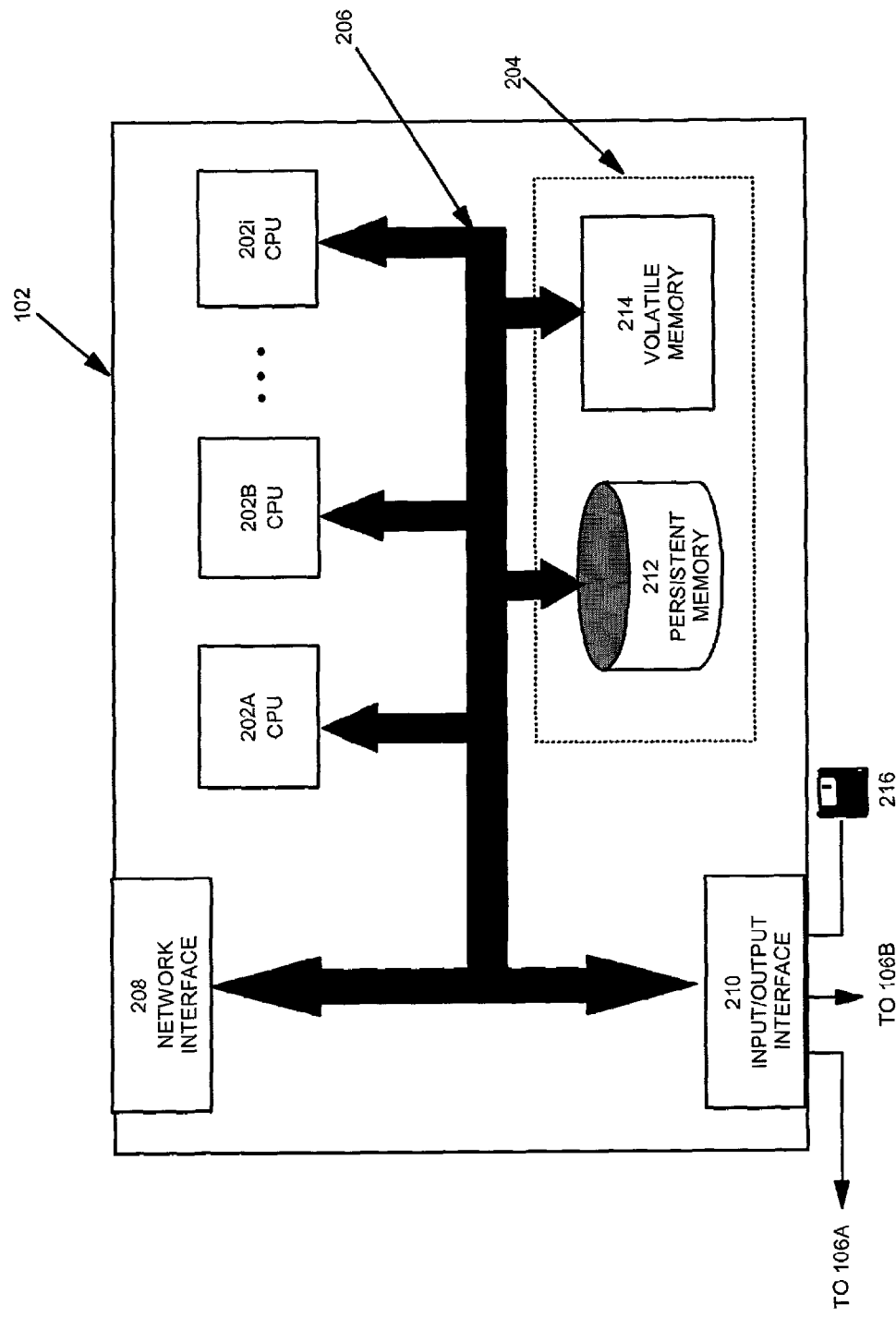
FIG. 2 schematically illustrates, in greater detail, a portion of the computer system of FIG. 1.

Exemplary processing system 102 is illustrated in greater detail in FIG. 2. As illustrated, processing system 102 includes several components—a processing facility which includes a plurality of central processing units (CPUs) 202A, 202B, . . . 202i, memory 204, network interface (I/F) 208 and I/O I/F 210. Each component is in communication with the other components via a suitable communications bus 206 as required.

Each of CPUs 202 is a processing unit arranged and adapted for inclusion in a multiprocessing system. Each CPU 202 may be, for example, an Intel Pentium III™ Xeon™, IBM PowerPC™, Sun Microsystems UltraSparc™ processor or the like, suitable for multiprocessor environments and the operations described herein. As will be appreciated by those of ordinary skill in the art, other embodiments of processing system 102 could use alternative CPUs. CPUs 202 may include various support circuits to enable communication between itself and the other components of processing system 102.

Memory 204 includes both volatile memory 214 and persistent memory 212 for the storage of: operational instructions for execution by CPU 202, data registers, application storage and the like. Memory 204 preferably includes a combination of random access memory (RAM), read only memory (ROM) and persistent memory such as that provided by a hard disk drive(s).

Network I/F 208 enables communication between computer system 100 and other network computing devices (not shown) via network 110. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 110.

I/O I/F 210 enables communication between processing system 102 and the various I/O devices 104, 106. I/O I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 may be used to provide instructions for execution by CPU 202 or as a removable data storage device.

Figure 3:
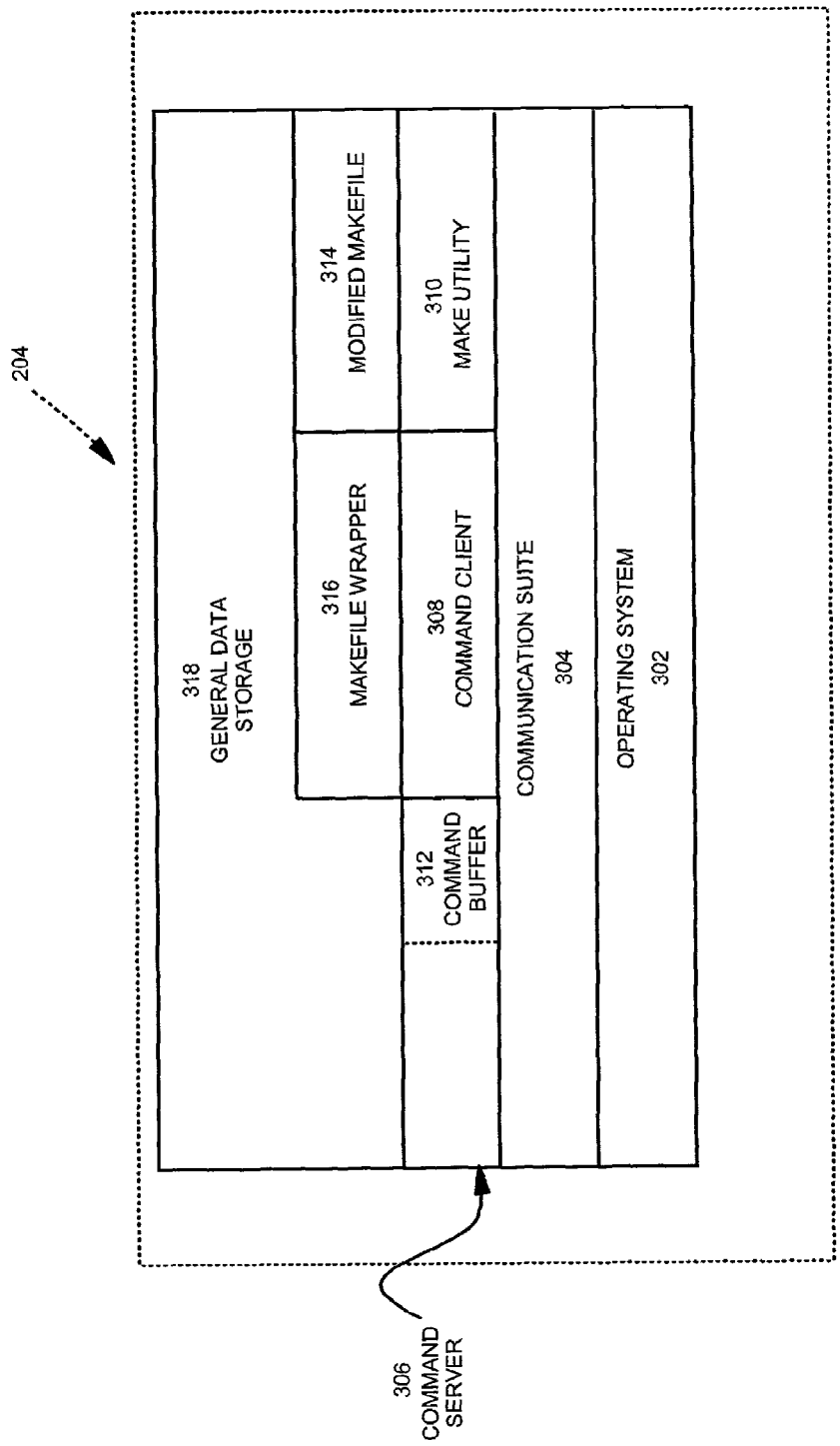
FIG. 3 illustrates, in functional block form, a portion of FIG. 2.

The computer instructions/applications stored in memory 204 and executed by one or more CPUs 202 (thus adapting the operation of computer system 100 as described herein) are illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application. Instructions/applications may be loaded into computer system 100, or executed, from media 212. Alternatively, computer instructions/applications may be retrieved from a remote system through network 110.

As illustrated, for exemplary purposes only, memory 204 stores operating system (OS) 302, communications suite 304, command server 306, command client 308, make utility 310, buffer 312 (which forms part of command server 306), modified makefile 314 and makefile wrapper 316 and general data storage area 318.

OS 302 is an operating system suitable for operation with selected CPUs 202 and the operations described herein. Multitasking, multithreaded and multiprocessor OSes such as, for example, IBM AIX™, Microsoft Windows NT™, Linux or the like, are expected in many embodiments to be preferred.

Communication suite 304 provides, through interaction with OS 302 and network I/F 208 (FIG. 2), suitable communication protocols to enable communication with other networked computing devices via network 110 (FIG. 1). Communication suite 304 may include one or more protocols such as, for example, TCP/IP, ethernet, token ring and the like. In the exemplary embodiment command server 306 and command client 308 (each described in greater detail below) communicate using TCP/IP sockets and, thus, use the services provided by communication suite 304. As will be appreciated, other communication protocols could be employed to facilitate communication between command server 306 and command client 308.

Command server 306, which is preferably written in a platform independent language such as, for example, Java, operates to provide a configurable facility for processing (e.g., compiling, linking, etc.) some or all of the targets in parallel. As will be appreciated by those of ordinary skill in the art, other programming languages such as, for example, C, C++ and the like, could also be employed. Command server 306 receives processing commands (e.g., commands to compile, commands to link, etc.) from command client 308, buffers these processing commands, and when instructed to do so by command client 308, may perform or execute the buffered processing commands in a parallel manner.

Command server 306 is adapted to provide for a selectable range of parallel compilation. In the exemplary embodiment, the range or degree of parallelization is configured by providing command server 306 with a parameter or argument which limits the number of independent processes that can be executed. Additionally, command server 306 is adapted to communicate with command client 308 provided command client 308 is properly authenticated. As is discussed above, communication between command server 306 and command client 308 is provided through the use of TCP/IP communication.

Configuration of the command server 306 is, in the exemplary embodiment, provided by passing two arguments to command server 306: a maximum number of processes argument ("maxNumberOfProcesses"); and a server port number argument ("serverPortNumber"). The maxNumberOfProcesses variable is used by command server 306 to limit the maximum number of threads that can be spawned by command server 306 for the compiling of selected targets. As it is possible that the number of buffered processing commands may exceed the number of threads created (configured by the maxNumberOfProcesses argument), not all of the buffered processing commands may be executed simultaneously. Rather, subsets or portions of the buffered processing commands may be executed in parallel. For example, if the maxNumberOfProcesses arguments limits command server 306 to create five threads and more than five processing commands are buffered, only a subset (five) of the processing commands can be processed simultaneously. As individual threads complete the execution of a processing command, the thread can be used to execute an additional buffered processing command until all buffered processing commands have been executed.

In the exemplary embodiment, providing a maxNumberOfProcesses of "1" to command server 306 configures command server 306, and thus computer system 100, to build targets in a serialized manner (i.e., without parallelization). The serverPortNumber variable is used by command server 306 for communication with command client 308 via communication suite 304.

Command server 306 is adapted to be multithreaded thus enabling command server 306 to launch multiple streams/threads of execution, each thread capable of processing (i.e., compiling, linking, etc.) a separate target. Additionally, in the exemplary embodiment, command server 306 pools threads. That is, command server 306 is adapted to launch several threads and then, when required, use one or more threads for the compiling of targets. The pooling of threads will improve CPU throughput utilization while minimizing the overhead of creating a new thread each time a target requires compiling. As a consequence, command server 306 reduces the wasting of CPU resources.

Command client 308, which is preferably written in a platform independent language such as, for example, Java, operates to receive processing commands from a modified makefile. The received processing commands (described in greater detail below) are then forwarded to command server 306 for later execution. As will be appreciated by those of ordinary skill in the art, other programming languages such as, for example, C, C++ and the like, could also be employed.

Processing commands forwarded by command client 308 to command server 306 may be stored in a file or as a message (e.g., encapsulated in a TCP/IP packet) which is transmitted to command server 306. In some instances (such as for lengthy commands), it may be preferable for command client 308 to store a processing command in a command file. The command file can then be provided to command server 306. A file may be provided to command server in a variety of manners. For example, the file itself could be passed to command server 306, the name of the file could be provided to command server 306 or the name of the file could be preselected prior to executing either command server 306 or command client 308. Due to processing command length constraints in the command shell of Microsoft Windows NT™, use of a command file to transmit processing commands between command client 308 and command server 306 may be preferable to ensure that the command length constraints are not violated.

Command client 308 is also adapted to receive data from command server 306. The data received by command client 308, described in greater detail below, include commands, authentication requests, acknowledgments and exit or return codes. As will be apparent, command client 308 and command server 306 communicate. This communication, in the exemplary embodiment, is facilitated through TCP/IP sockets provided by the services of communication suite 304.

Additionally, command client 308 operates to receive up to two separate arguments: a server port identifier and a command. The server port identifier is used by command client 308 to identify the port for communicating with command server 306. Commands received by command client 308 include commands to: terminate operations of command server 306 ("@terminate"); provide authentication data (e.g., a user identifier or time stamp); operate in the background until an acknowledgment of successful operation of command server 306 has been received (@ack); and issue instructions to have commands stored in the command buffer 312 of command server 306 executed ("@execute"). The "commands" identified in quotes and preceded by the "@" symbol will be used hereinafter and in the accompanying figures.

Make utility 310 is a conventional make utility which interprets modified makefile 314.

Modified makefile 314, which generally is an ASCII text file, has a structure similar to a conventional makefile described above. An example recipe for modified makefile 314 is as follows:

target: dependency (or dependencies)
    <command client><command(s) to build the target from the dependencies>

When make utility 310 encounters a recipe in modified makefile 314, in the structure outlined above, a command client 308 will be passed the "command(s) to build the target from the dependencies". Command client 308 will, upon receiving the instruction to "command(s) to build the target from the dependencies", operate on these received instructions (described below) and pass the results to command server 306.

Modified makefile 314 may, alternatively, also employ macros. In such an instance, an example of a recipe in modified makefile 314 is as follows:

<complier macro>=<command client><compiler tool executable>
    target: dependency (or dependencies)
    <compiler macro><flags><dependencies>

Makefile wrapper 316 is, in the exemplary embodiment, an ASCII textfile which is used to control the order in which a group of targets for parallelization is processed. Makefile wrapper 316, which is structured to be interpreted by make utility 310, provides three general functions:

(i) configuration of communication facilities and degree of parallelization by identifying the maximum number of parallel threads/processes that may be employed; (ii) initialization of an instance of command server 306 configured appropriately, (iii) grouping of instructions (e.g., compiling, linking, SQL preprocessing, execution of batch files/scripts, etc.) for execution; and (iv) cleanup (i.e., termination) of executing instances of command client 308 and/or command server 306. Makefile wrapper 316 is best understood with reference to the exemplary makefile wrapper 316 detailed and described below.

Figure 4:
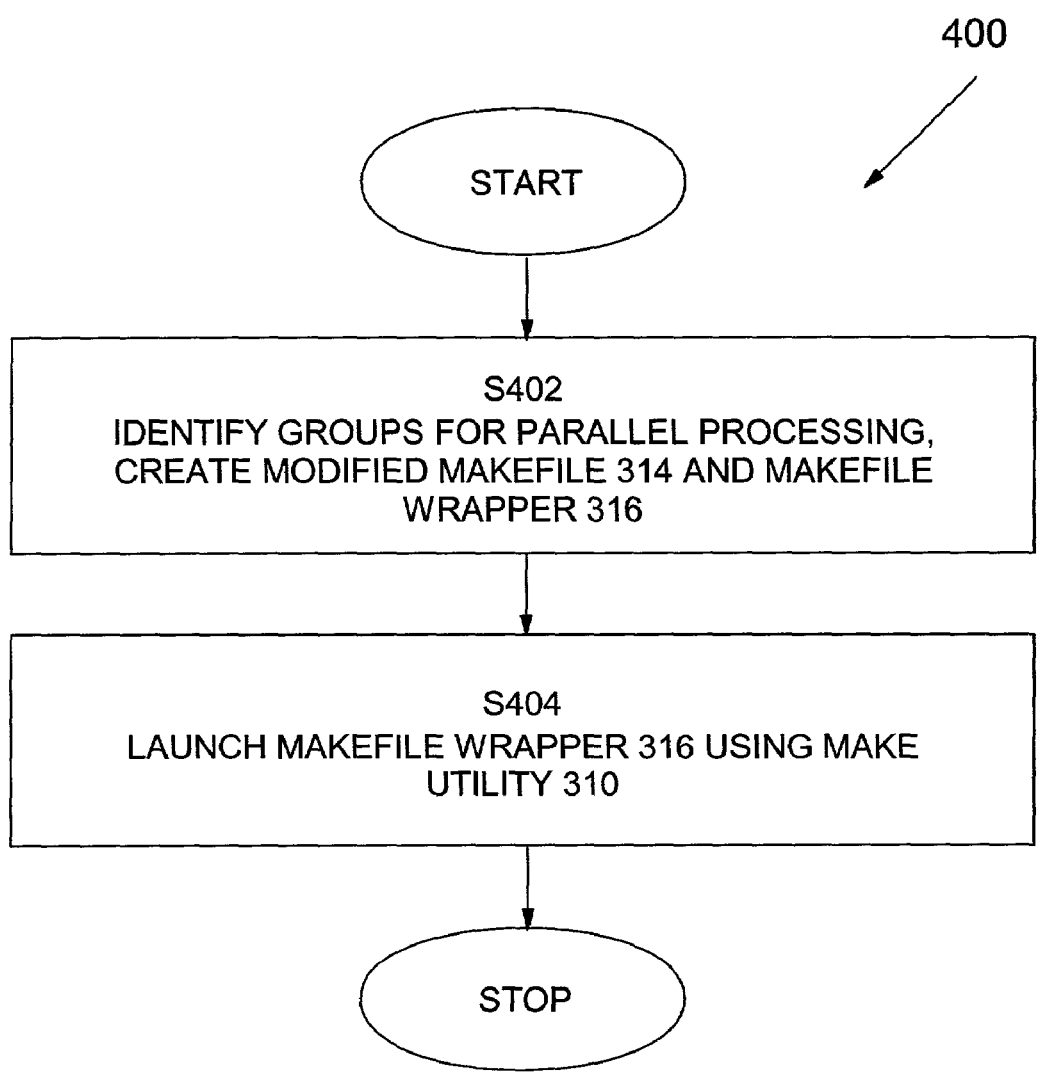
FIG. 4 is a flowchart of exemplary operations of the computer system of FIG. 1.

Referring to FIG. 4, operations 400 are performed by computer system 100 to build a target based on the instructions in makefile wrapper 316 and modified makefile 314. In the following exemplary explanation of operations 400 the following exemplary files (modified makefile 314 and makefile wrapper 316) will be used to assist in describing the invention. For ease of understanding, a conventional exemplary makefile is also listed to assist in comparing an exemplary conventional makefile with its modified counterpart—modified makefile 314.

Conventional, Exemplary Makefile
    # tool macros
    CC=icc
    LNK=icc
    all: t.exe
    objs: t1.obj t2.obj . . . tN.obj
    t.exe: t1.obj t2.obj . . . tN.obj
        $(LNK) t1.obj t2.obj . . . tN.obj
    t1.obj: t1.c
        $(CC)-c t1.c
    t2.obj: t2.c
        $(CC)-c t2.c
    . . .
    tN.obj: tN.c
        $(CC)-c tN.c In this conventional exemplary makefile, there are two groups which are potential candidates for parallelization: (1) t.exe; and (2) targets t1.obj, t2.obj, . . . , tN.obj. Accordingly, using this information the following exemplary modified makefile 314 and makefile wrapper 316 can be constructed (S402):

Exemplary Modified Makefile 314
    # tool macros
    CC=<command client>$(serverPortNumber) icc
    LNK=<command client>$(serverPortNumber) icc
    all: t.exe
    objs: t1.obj t2.obj . . . tN.obj
    t.exe: t1.obj t2.obj . . . tN.obj
        $(LNK) t1.obj t2.obj . . . tN.obj
    t1.obj: t1.c
        $(CC)-c t1.c
    t2.obj: t2.c
        $(CC)-c t2.c
    . . .
    tN.obj: tN.c
        $(CC)-c tN.c Exemplary Makefile Wrapper 316
    serverPortNumber=8792
    maxNumberOfProcesses=4 all: initserver group1 group2 killserver
initserver:
    <command client>$(serverPortNumber) @terminate
    <command server>$(serverPortNumber) $(maxNumberOfProcesses)
    <command client>$(serverPortNumber) @ack
group1:
    nmake-f<modified makefile> objs serverPortNumber=$(serverPortNumber)
    <command client>$(serverPortNumber) @execute
group2:
    nmake-f <modified makefile> all serverPortNumber=$(serverPortNumber)
    <command client>$(serverPortNumber) @execute
killserver:
    <command client>$(serverPortNumber) @terminate The grouping of the independent targets may be selected based on the knowledge of the user of an embodiment of the invention. However, an automation tool could be employed which combines the functions of makefile parsing tools and dependency analysis and generation tools. In this latter case, the combined makefile parser/dependency analysis and generation tool could be used to generate makefile wrapper 316 in an automated fashion. "Makedep" is one such dependency analysis and generation tool known in the Unix operating environment.

After modified makefile 314 and makefile wrapper 316 have been constructed (S402), makefile wrapper 316 is launched (S404). Makefile wrapper 316 may be launched using, for example, the following command: nmake-f <makefile wrapper>, where nmake is an instance of a make utility 310. As a result of operation S404, the "initserver", "group" and "killserver" operations will be performed.

Figure 6:
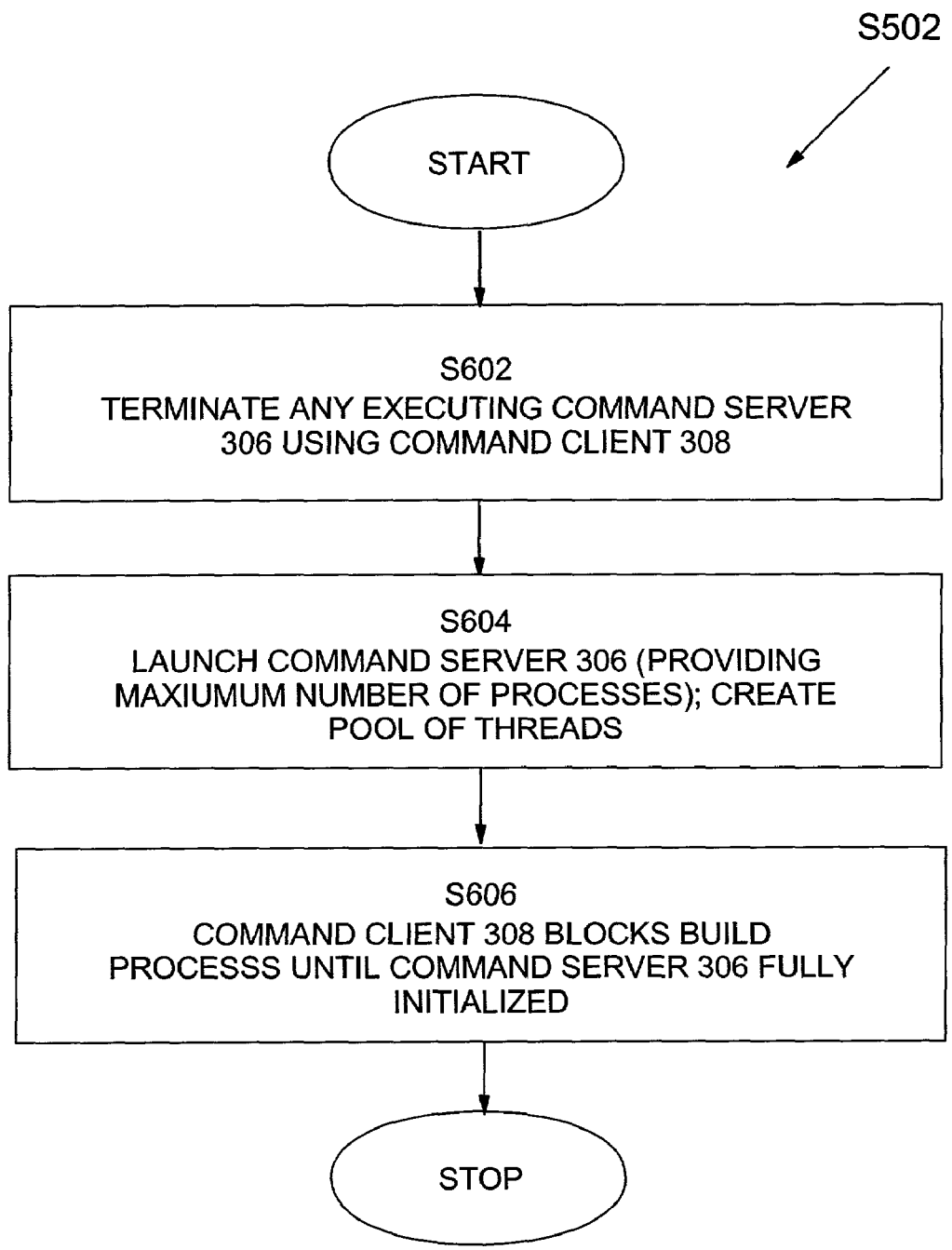
FIG. 6 is a flowchart providing additional detail of a first portion of the operations of FIG. 5.

In the "initserver" operations (S502, which is illustrated in greater detail in FIG. 6, and with reference to the above exemplary modified makefile 314 and makefile wrapper 316), a command client 308 will be executed and provided two arguments: the server port identifier (8792) and the command "@terminate". Operation S502 is illustrated in greater detail in FIG. 6. Command client 308 will initially obtain a user identifier (userID) which may be used for later authentication purposes and then, as a result of the "@terminate" command, command client 308 attempts to terminate any other command server 306 executing using the same server port number (in the exemplary makefile wrapper 316, port 8792) (S602). Additionally, if a timestamp file—a file which contains the date and time when command client 308 was launched—does not exist, command client 308 creates a timestamp file. Command client 308 then terminates operation.

The timestamp file in the exemplary embodiment serves two purposes: (1) it is used to prevent inadvertent termination of command server 306; and (2) to allow for the unconditional termination of command server 306 by the user (i.e., the owner of command server 306) whose userID was used to launch command server 306.

An example of illustrating both purposes of the timestamp file is as follows. Assume a first user ("UserA") launches a build in a directory X at a certain time $T_0$. The command server 306 launched by UserA ("command server 306A") will be configured with a timestamp of $T_0$ and a file containing this timestamp ("timestamp fileA" will be created in directory X. Further assume that UserA then, in a different directory, directory Y, at time $T_1$ (where $T_1>T_0$) attempts to start a different build using the same port number. The initserver process' first command is an attempt to terminate the server. Although the userID ("userA") is the same as before, the new timestamp $T_1$ is not the same as that for the first build. Consequently, command server 306A will issue an error message and send a response to the command client 308 launched in the second build attempt. Responsive to this error message received by command client 308 in the second build attempt, this command client 308 will be forced to terminate with a non-zero error code thus halting the new build without affecting the first build. However, if UserA truly wants to halt the first build and proceed with the second build, UserA can create (or copy from directory X) the timestamp file with the time $T_0$ before proceeding. When the second build proceeds, the initserver process' call to terminate the existing command server (command server 306A) will succeed and the previous (first) build will be halted as the userID and the timestamp will be properly authenticated and the first build.

Returning to FIG. 6 (S602), if a command server 306 is not listening at the specified server port (port 8792), the command client 308 terminates with a zero exit code allowing the build to continue.

Figure 8:
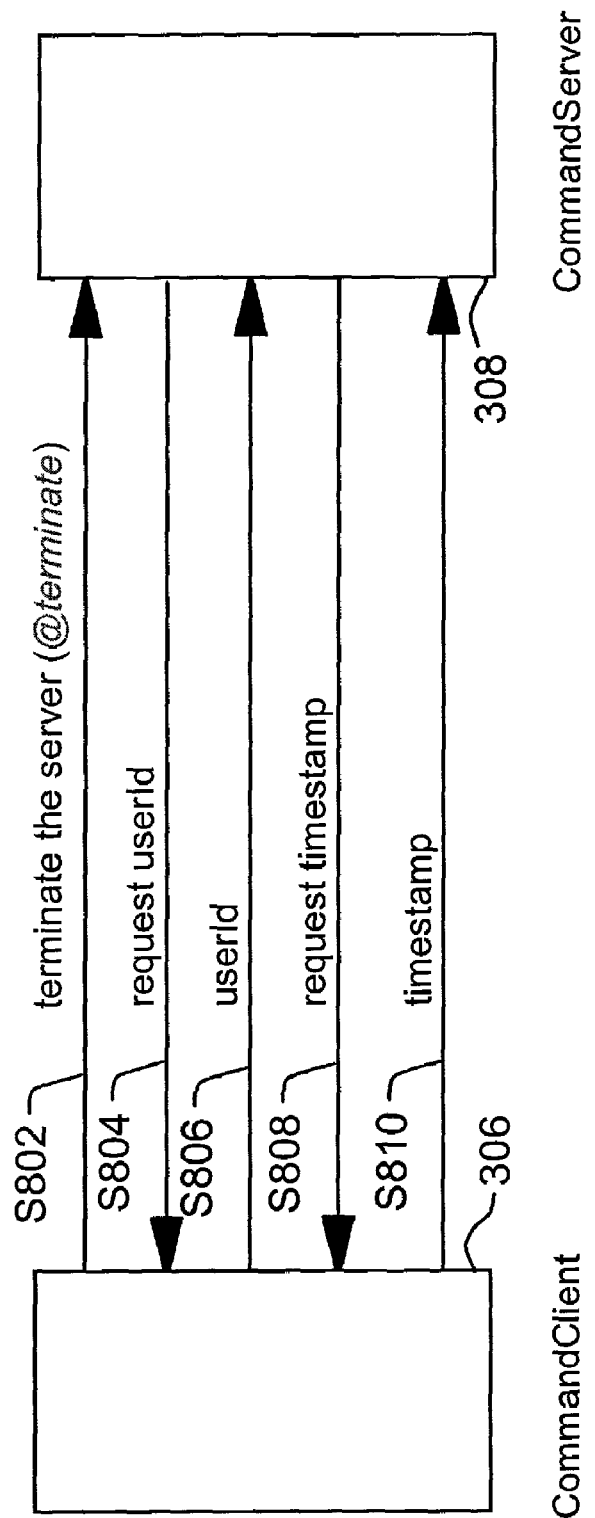
FIG. 8 is a first signal flow diagram of signals transmitted between portions of FIG. 3.

If a command server 306 is listening at the specified server port (8792), the interaction between command client 308 and command server 306 for terminating an instance of a command server 306 resulting from the command "@terminate" is illustrated in FIG. 8. Referencing FIG. 8, command client 308 issues a message to command server 306 (which is using the same server port) to terminate (S802). Responsive to this message, command server 306, in order to terminate, requires authentication data. Command server 306 requests from command client 308 a userID (S804) and a timestamp (S808). Responsive to these messages, command client 308 first provides the requested userID (S806) and then the timestamp (S810). If the command client 308 is authenticated by command server 306, command server 306 and command client 308 both terminate and the build continues. If authentication fails, command server 306 produces an error message and command client 308 terminates with a non-zero exit code to terminate the build.

The next instruction in the "initserver" operations of the exemplary makefile wrapper 316 is: "<command server> $(serverPortNumber) $(maxNumberOfProcesses)". Interpreting this instruction, make utility 310 launches a new command server 306 in the background providing two arguments: a server port number (8792 which is stored as variable serverPortNumber) and the maximum number of processes (four in the exemplary embodiment) which can be launched by command server 306 (S604—FIG. 6). The launched command server 306 creates a pool of threads equal in number to the argument "maxNumberOfProcesses". The threads comprising the pool of threads created can then be utilized, as required, by command server 306 to perform any necessary operations (e.g., compiling, linking, etc.). As will be appreciated by those of ordinary skill in the art, if the argument "maxNumberOfProcesses" passed to command server 306 is equal to one, then the pool of threads created will consist of only a single thread. Consequently, the compiling of objects will be handled serially.

As will be appreciated, the maximum number of processes and/or server port number arguments provided by makefile wrapper 316 are modifiable thus providing a user the ability to configure embodiments of the invention.

Finally, in the last portion of the "initserver" operations, an instance of a command client 308 is executed and provided two separate arguments: the server port identifier (8792) and an "acknowledge" command. As a result of the "acknowledge" command, and using the server port identifier and the TCP/IP facilities of communication suite 304, command client 308 will be executed and wait for further interaction with command server 306 (i.e., awaiting confirmation from command server 306) (S606). Since, as noted above, command server 306 is launched in the background, it is desirable to prevent the case where a command client 308 attempts to send it commands when command server 306 is not properly or fully initialized. Accordingly, in the exemplary embodiment, once command server 306 is properly or fully initialize, command server 306 acknowledges command client 308 issuing the "acknowledge" command causing command client 308 to terminate with a zero exit code allowing the build to proceed.

As a result of operations "initserver", a single instance of command server 306 is operating.

The "group" operations—"group1" and "group2"—are best understood with reference to FIGS. 5, 7A, 7B, 9 and 10. Operations S504 (FIG. 5) are performed once for each group of targets to be processed in parallel. In the exemplary makefile wrapper 316 there are two such groups: "group1" and "group2". Accordingly, S504, in the exemplary embodiment, is performed in twice.

In operations "group1" two instructions are interpreted by make utility 310:

nmake-f<modified makefile> objs serverPortNumber=$(serverPortNumber)
<command client>$(serverPortNumber) execute In the first instruction of "group1", another make utility 310 will be launched as a new make process which will operate to block further interpretation of makefile wrapper 316 until make utility completes its operations. This make utility 310 is provided three arguments: the identity of the file to use (in the exemplary embodiment, the name of modified makefile 314); the operations to perform ("objs") and the server port identifier ("serverPortNumber").

Referencing the exemplary modified makefile 314 above, "objs" operations will result in each ti.obj (where i=1, 2, . . . , N) being created as a result of the compilation of the corresponding ti.c source file which is compiled with reference to the macro "CC". The macro "CC" will result in a command client 308 being launched and provided with the serverPortNumber and the compiler ("icc") to be used to compile the object file.

Each instruction (after being interpreting by make utility 310) will be in the form of "<command client> (serverPortNumber) icc ti.c" where serverPortNumber is, in the example, 8792, "icc" is the compiler being employed and "ti.c" is the $i^{th}$ source file which is to be compiled. As a consequence, make utility 310 will, for operations "group1", launch serially "N" instances of command client 308—one for each from of the "N" targets (t1.obj, t2.obj, . . . , tN.obj) (S702—FIG. 7A).

Figure 7A:
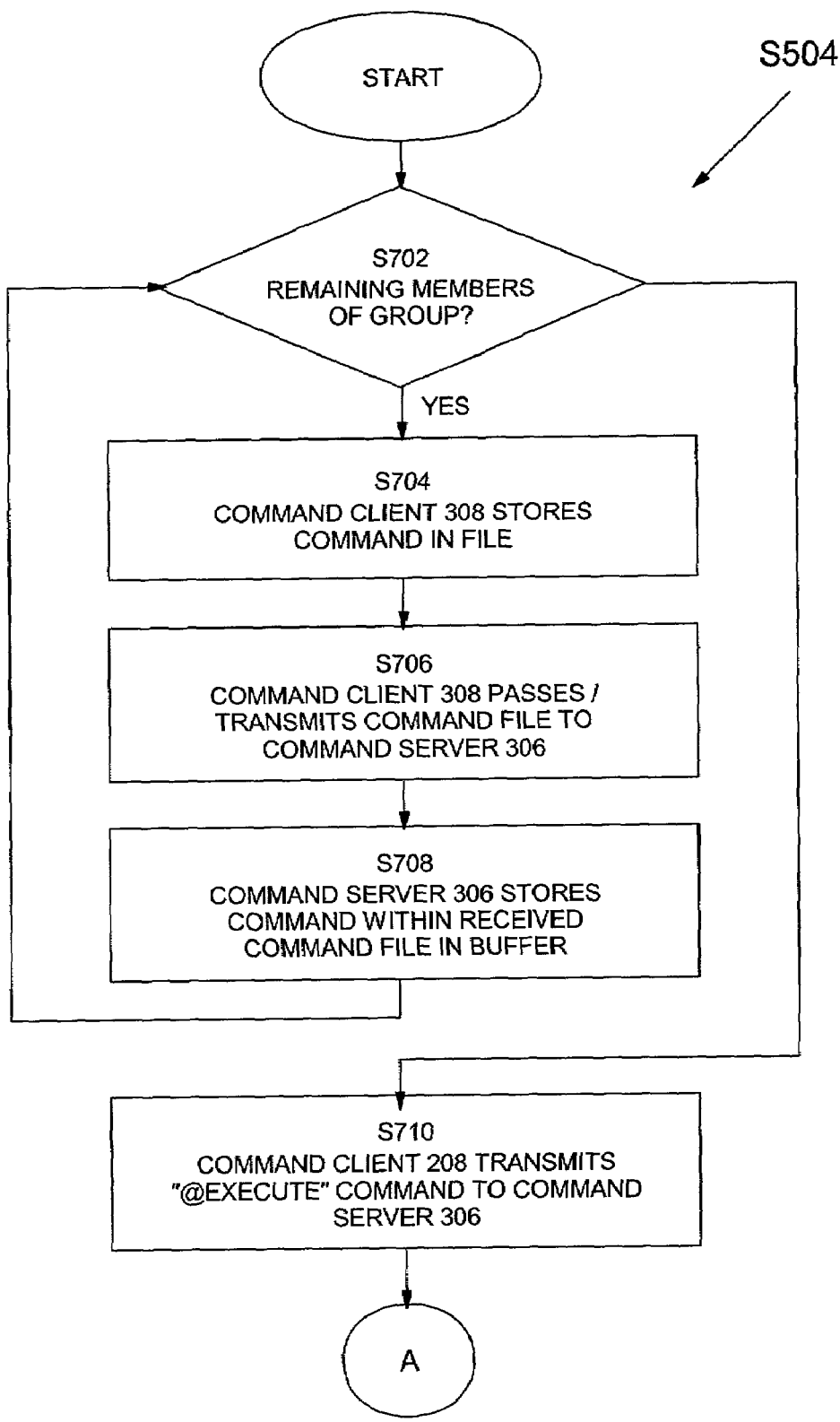
FIGS. 7A and 7B, which form a single flowchart, provide additional detail of a second portion of the operations of FIG. 5.
Figure 7B:
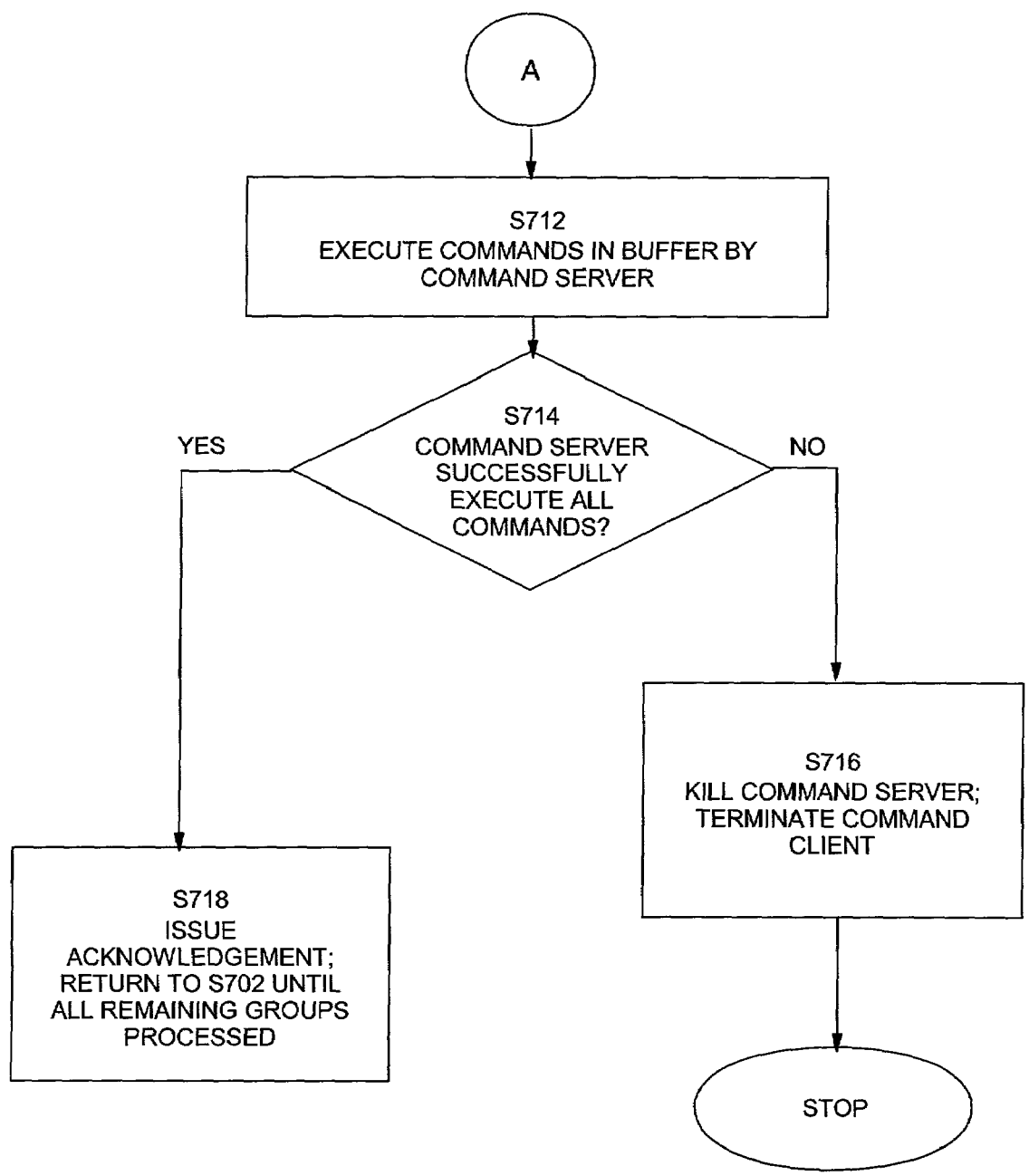
Figure 9:
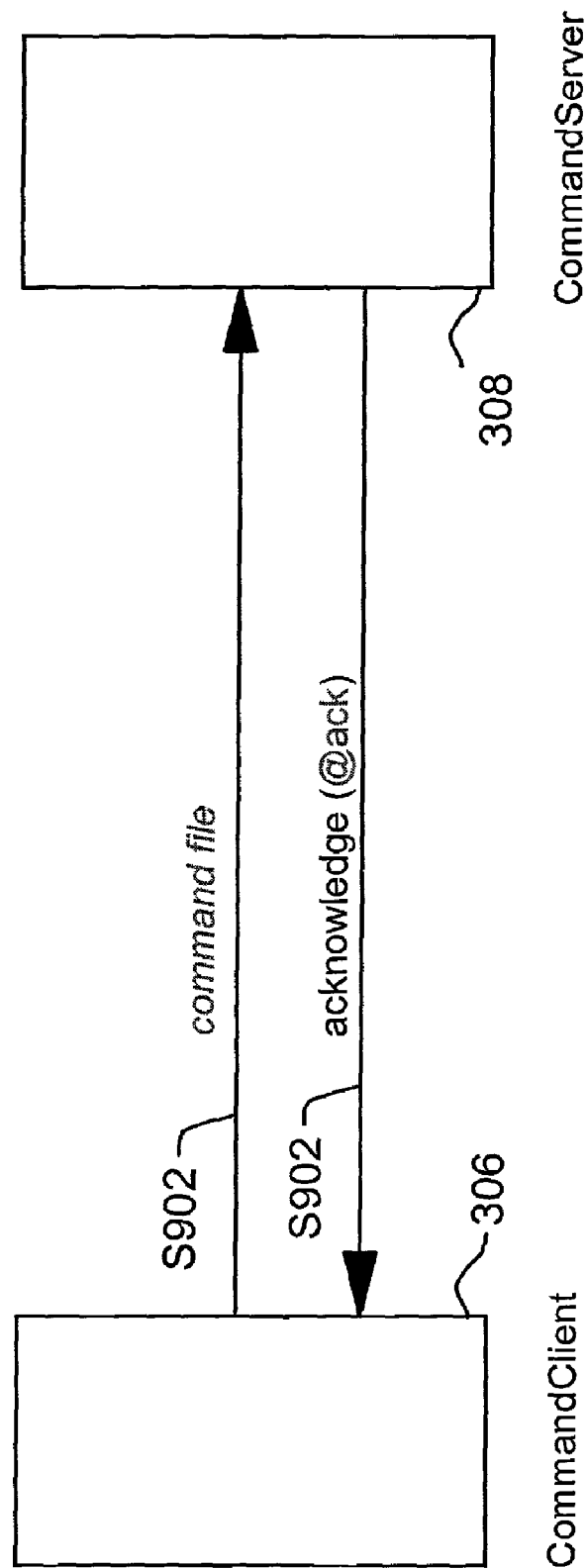
FIG. 9 is a second signal flow diagram of signals transmitted between portions of FIG. 3.

Referencing FIGS. 7A, 7B and 9, each command client 308 launched by make utility 310 in operations "group1" will result in the compilation command (e.g., icc ti.c) being stored in a file (to ensure that any command length constraints of OS 302—FIG. 3—are not violated) referred to hereinafter as the "command file" (S704). The command file is then passed by command client 308 to command server 306 (S706, S902). Command server 306, upon receipt of a command file, stores the command in the command file in buffer 312 (S708) and then issues an acknowledgment to command client 308 (S904). Upon receipt of acknowledgment S904, the command client 308 will then terminate.

As a consequence of the first portion of operations "group1": "N" instances of command client 308 have been launched; "N" instructions (stored temporarily in "N" "command files") have been forwarded to, and buffered by, command server 306 in buffer 312; and each of the "N" instances of command client 308 have been terminated. Accordingly, command server 306 has buffered (in buffer 312) the commands necessary to compile "N" targets.

Figure 10:
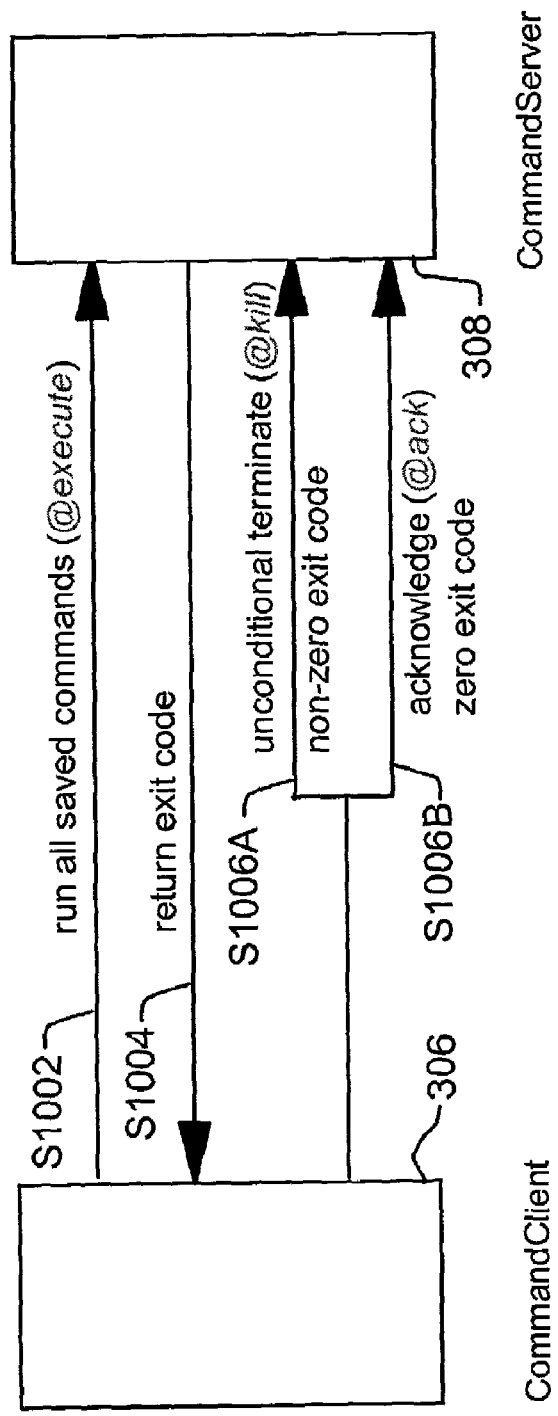
FIG. 10 is a third signal flow diagram of signals transmitted between portions of FIG. 3.

The second instruction of the "group1" of the modified makefile 316 ("<command client>$(serverPortNumber) @execute") launches a command client 308 with the appropriate server port number and the command "@execute" (S710). The messages which result from the "@execute" command are illustrated in FIG. 10.

Initially, the command client 308 which is launched issues a message (S1002) instructing command server 306 to execute the instructions which have been received and buffered (in this exemplary scenario, command server 306 has buffered "N" such instructions in buffer 312). Command server 306, upon receiving an "@execute" message from command client 308, will execute each of the commands stored in buffer 312 (S712—FIG. 7B). In the example, each of the commands stored in buffer 312 correspond to an instruction to compile a source code file "ti.c". Accordingly, command server 306 will use the threads previously created in the pool of threads to execute these commands. After a selected thread completes compiling a source file, the thread is returned to the thread pool and, if necessary, may be used by command server 306 to compile another source file until all instructions in buffer 312 have been completed. As indicated above, in the exemplary embodiment four threads are created and pooled by command server 306. Accordingly, each of the four threads can be used, simultaneously, to compile one of the "N" source files. As will be appreciated, the number of threads may be increased or decreased depending upon the configuration argument provided to command server 306 which should be selected to be suitable for the computational power and architecture of computer system 100. Generally, the number of threads ("maxNumberOfProcesses") will correspond to the number CPUs 202 (FIG. 2).

As a result of operations "group1" each of the "N" source files ti.c will have been compiled with as many as four (maxNumberOfProcesses) source files being compiled simultaneously.

After executing the instructions stored in buffer 312, command server 306 will return an exit code to command client 308 (S1004). If the return code received by command client 308 indicates that a command executed by command server 306 (which were stored in buffer 312) has resulted in some type of failure (S714—FIG. 7B), command client 308 will issue a command (@kill) to unconditionally terminate command server 306 (S716, S1006A). In this instance an error message or log may be created to inform a user of the abnormal termination of the target build. However, if the return exit code received by command client 308 in S1004 indicates a successful execution of the commands previously stored in buffer 312 (S714), command client 308 issues an acknowledgment command (@ack) (S718, S1006B) and the commands of "group2" may then be completed.

The "group2" operations (S504—FIG. 5) of modified makefile 314 are performed in a similar manner to those described above. As will be appreciated, buffer 312 used by command server 306 will be re-initialized (i.e., cleared) at this time.

Figure 5:
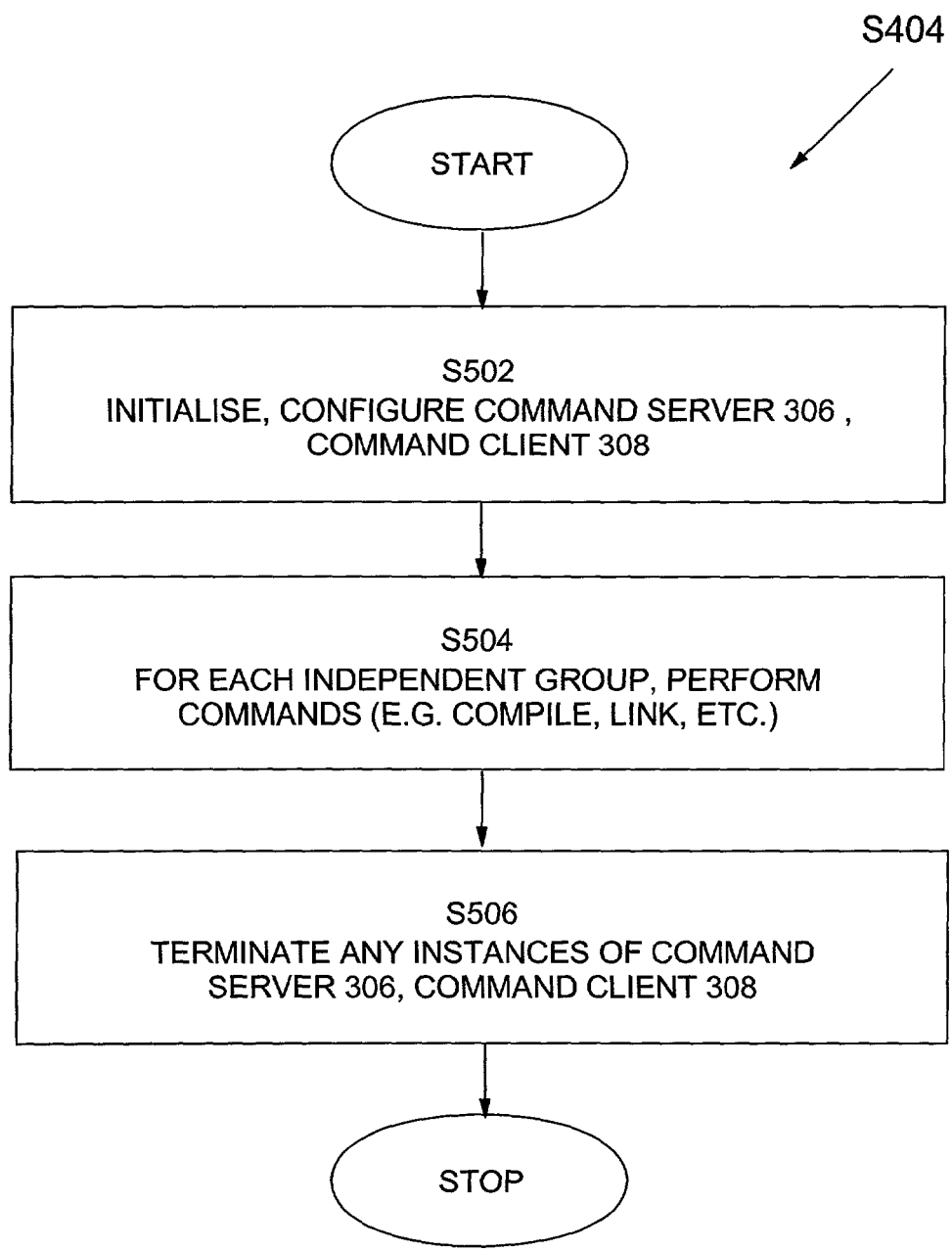
FIG. 5 is a flowchart providing additional detail of a portion of the operations of FIG. 4.

Assuming successful completion of both "group1" and "group2" operations, make utility 310 will perform operations "killserver" (S506—FIG. 5). That is, the make utility will interpret the instruction "<command client>$(serverPortNumber) @terminate". As a result of this instruction, command client 308 will terminate the executing command server 306 and then command client 308 will itself terminate.

As a result of the foregoing, persons of ordinary skill in the art will appreciate that through operation of, and interaction between, command server 306 and command client 308, the creation of makefile wrapper 316 together with minor modifications to a makefile (resulting in modified makefile 314), a method, system, apparatus and related embodiments for cross platform, parallel processing (e.g., compiling, linking, SQL preprocessing, execution of batch files/scripts, etc.) is provided.

Embodiments of this cross platform parallel processing invention provide users with a valuable tool which will compile, in parallel, targets which, as a result of a lack of interdependency, can be built in any order. Embodiments may first identify one or more targets (i.e., object files) which are candidates for parallel compilation ("parallelization"). From the targets identified instructions are generated, which may be stored in a file (a makefile wrapper file 316), which provides the identity of targets for parallelization and the order in which these targets should be built. The instructions may then be executed thus providing reduced compiling time and, thus, improving productivity.

Embodiments of the invention may be implemented using the Java™ programming language. Consequently, implementations may be independent of the shell and makefile interpreters employed. Other programming languages such as, for example, C, C++ and the like, could also be employed.

Advantageously, embodiments of the invention enable control of the degree of parallel compilation performed (using for example a configurable argument such as "maxNumberOfProcesses"). Accordingly, embodiments may more effectively harness the power of those systems with multiple processors while ensuring that embodiments deployed on systems with comparatively fewer processors are not overwhelmed.

Additionally and advantageously, embodiments of the invention are enabled to selectively compile targets in parallel. Accordingly, some targets (e.g., Java source files which have complex dependencies with other source files that may only be partially known) may be selected to be compiled in a serial rather than parallel fashion.

In a further advantage the structure of a text file which, in some embodiments of the invention, stores instructions to be executed for the parallel compilation of identified and selected targets is arranged such that it follows or is similar to the structure of a conventional makefile.

As will be appreciated by those skilled in the art, modifications to the above-described embodiment can be made without departing from the essence of the invention.

For example, an alternative embodiment of the present invention could reduce command client 308 and command server 306 to a single executable. In this alternative, a different communication protocol may be employed and used in combination with commonly available clients. For example, If we used the HyperText Transport Protocol (HTTP) instead of TCP/IP raw sockets, the command server, in this alternative embodiment, could be a simple HTTP server and the command client could be a web browser or the engine of a web browser.

In further alternative embodiment, it may be desirable in some instances to combine the makefile wrapper 316 with modified makefile 314. This alternative embodiment may not be preferred where the environment in which the invention is deployed requires the invention to process multiple makefiles. However, in some instances this alternative embodiment may be preferred. In such instances, the or some cases, a single and combined makefile wrapper 316/modified makefile 314 could, for example, employ the following exemplary structure:

Exemplary Combined Makefile Wrapper 316/Modified Makefile 314

```
CC=<command client>icc
all: initserver t1.obj t2.obj . . . TN.obj exec killserver
initserver:
    <command client><serverPortNumber>@terminate
    <command server><serverPortNumber><maxNumberOfProcesses>
    <command client><serverPortNumber>@ack
exec:
    <command client><serverPortNumber>@execute
killserver:
    <command client><serverPortNumber>@terminate
t1.obj: t1.c
    $(CC)-c t1.c
t2.obj: t2.c
    $(CC)-c t2.c
. . .
tN.obj: tN.c
    $(CC)-c tN.c
```

This exemplary combined makefile wrapper 316/modified makefile 314 would preserve the interface for launching the makefile.

In a further alternative, embodiments of the invention could designed to parallelize across multiple machines (i.e., multiple computer systems). In this alternative, the processing facilities used by embodiments of the invention would include the CPUs from each of the multiple machines (with each machine having one or more individual CPUs). In such an embodiment command servers would need to operate on the multiple machines and a gateway command server (e.g., central command server) could be employed on the machine from where the build is launched. The gateway command server would funnel or direct build requests to the various command servers on the other machines according to some load balancing scheme and the command client wait for all the command servers to finish during an @execute command. In this alternative embodiment, the launch or execution of individual command servers on each of the remote machines could be automated. As those of ordinary skill in the art will appreciate, the use of this alternative embodiment, wherein parallelization is distributed across multiple machines may result in even more substantial performance gains while employing machines of lower caliber (i.e., of less computational power) as compared to a single machine employing multiple processors as described above.

In a further alternative, processes could be employed rather than threads. However, processes, generally, require more overhead and, in the Java environment, threads are supported to a greater extent.

Furthermore, while many of the exemplary embodiments of the invention described herein employ a multiprocessor system, , as those of ordinary skill in the art will appreciate, alternative embodiments of the invention could also be deployed on a single processor system.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

What is claimed is:

1. A method for processing at least some of a plurality of targets in parallel comprising:
    receiving a first data structure having a plurality of first targets to be processed in a serial manner;
    identifying a plurality of second targets within said plurality of first targets that may be processed in parallel;
    grouping said plurality of second targets that may be executed in parallel into one or more groups of second targets, wherein each of said targets in said one or more groups of second targets are independent of each other one of said second targets within a same group;
    generating a second data structure based on said one or more groups of second targets;
    buffering a plurality of processing commands based on said second data structure, said processing commands corresponding to said plurality of second targets;
    launching a plurality of threads; and
    for each of said plurality of processing commands buffered, executing a processing command in one of said plurality of threads, wherein at least two of said plurality of processing commands are executed in parallel, and wherein a number of said plurality of threads equals a maximum number of threads that may execute in parallel, and wherein said maximum number of threads is identified in a configurable parameter configured for a particular data processing system in which the method is implemented.

2. The method of claim 1, wherein said plurality of threads form a pool of threads, and wherein threads in said pool of threads are reusable to execute buffered processing commands.

3. The method of claim 1, wherein said processing commands executed in parallel comprise commands to perform one or more of the following operations:
    compiling, linking, preprocessing of SQL commands and execution of batch files or scripts.

4. The method of claim 1, wherein said first data structure is a makefile and wherein said second data structure comprises a makefile wrapper that identifies a manner by which each of said one or more groups of second targets are to be processed.

5. The method of claim 3 further comprising prior to said buffering, receiving said plurality of processing commands serially.

6. The method of claim 5 wherein said plurality of processing commands received serially comprise processing commands received from a make utility.

7. The method of claim 6 wherein a command client serially receives said plurality of processing commands from a make utility.

8. The method of claim 7 further comprising:
    storing each of said plurality of processing commands in a corresponding number of files; and
    prior to said buffering, transmitting said corresponding number of files to a command server.

9. The method of claim 8 wherein said buffering comprises:
    said command server storing processing commands, stored in said corresponding number of files received, in a buffer.

10. The method of claim 9 wherein said command client and said command server communicate using TCP/IP.

11. The method of claim 8 wherein said plurality of threads is launched by said command server.

12. The method of claim 11 further comprising:
    prior to buffering, passing to said command server a maximum number of processes argument.

13. The method of claim 12 wherein the number of said plurality of threads launched by said command server corresponds to said maximum number of processes argument.

14. The method of claim 5, wherein said second data structure is a makefile, and wherein said makefile is interpreted by said makefile utility.

15. An apparatus for processing targets in parallel comprising:
    a makefile analysis and generation tool that receives a makefile, analyzes said makefile to identify targets within the makefile that may be processed in parallel, and groups said targets that may be executed in parallel to generate a makefile wrapper;
    a make utility that generates a plurality of processing commands based on said makefile wrapper;
    a receiver serially receiving said plurality of processing commands from said make utility;
    a processing facility adapted to:
    buffer said plurality of processing commands received;
    launch a plurality of threads; and
    execute each of said plurality of processing commands, said each of said plurality processing commands executed by one of said plurality of threads, whereby at least two of said plurality of processing commands are executed in parallel.

16. The apparatus of claim 15 wherein said receiver comprises a command client and wherein said processing facility comprises a command server.

17. The apparatus of claim 16 wherein said command client and said command server communicate using a communications protocol.

18. The apparatus of claim 17 wherein said communications protocol comprises the TCP/IP protocol.

19. The apparatus of claim 17 wherein said command client stores each processing command received in a file and transmits said file to said command server.

20. The apparatus of claim 19 wherein said command server accesses files received from said command client and buffers said processing command therein in a memory.

21. The apparatus of claim 18 wherein said command client and said command client comprise a single executable.

22. The apparatus of claim 15 wherein said processing facility comprises a plurality of central processing units.

23. The apparatus of claim 22 wherein said plurality of central processing units are distributed amongst a plurality of networked computer systems.

24. The apparatus of claim 22 wherein said plurality of central processing units comprise a single computer system.

25. A computer readable media storing instructions and data, said instructions and data capable of adapting a computer system to:
    receive a first data structure having a plurality of first targets to be processed in a serial manner;
    identify a plurality of second targets within said plurality of first targets that may be processed in parallel;
    group said plurality of second targets that may be executed in parallel into one or more groups of second targets, wherein each of said targets in said one or more groups of second targets are independent of each other one of said second targets within a same group;

generate a second data structure based on said one or more groups of second targets;

buffer a plurality of processing commands based on said second data structure, said processing commands corresponding to plurality of second targets requiring processing;

launch a plurality of threads; and for each of said plurality of processing commands buffered, execute a processing command in one of said plurality of threads, wherein at least two of said plurality of processing commands are executed in parallel, and wherein a number of said plurality of threads equals a maximum number of threads that may execute in parallel, and wherein said maximum number of threads is identified in a configurable parameter configured for a particular data processing system in which the instructions are executed.

26. The computer readable media of claim 25, wherein said plurality of threads form a pool of threads, and wherein threads in said pool of threads are reusable to execute buffered processing commands.

27. The computer readable media of claim 25, wherein said processing commands executed in parallel comprise commands to perform one or more of the following operations: compiling, linking, preprocessing of SQL commands and execution of batch files or scripts.

28. The computer readable media of claim 25, wherein said first data structure is a makefile and wherein said second data structure comprises a makefile wrapper that identifies a manner by which each of said one or more groups of second targets are to be processed.

29. The computer readable media of claim 27 further adapting said computer system to: prior to said buffering, receive said plurality of processing commands serially.

30. The computer readable media of claim 29 wherein said plurality of processing commands received serially comprise processing commands received from a make utility.

31. The computer readable media of claim 30 wherein a command client serially receives said plurality of processing commands from a make utility.

32. The computer readable media of claim 31 further adapting said computer system to:

store each of said plurality of processing commands in a corresponding number of files; and prior to said buffering, transmit said corresponding number of files to a command server.

33. The computer readable media of claim 32 wherein said buffer comprises:

said command server storing processing commands, stored in said corresponding number of files, received in a buffer.

34. The computer readable media of claim 33 wherein said command client and said command server communicate using TCP/IP.

35. The computer readable media of claim 32 wherein said plurality of threads is launched by said command server.

36. The computer readable media of claim 33 further adapting said computer system to:

prior to buffering, pass to said command server a maximum number of processes argument.

37. The computer readable media of claim 36 wherein the number of said plurality of threads launched by said command server corresponds to said maximum number of processes argument.

38. A method for processing at least some of a plurality of targets in parallel comprising:

receiving a parameter identifying a maximum number of threads that may execute in parallel;

buffering a plurality of processing commands, the processing commands corresponding to the plurality of targets, the plurality of targets being independent of each other;

launching a plurality of threads, wherein a number of threads launched in the plurality of threads is determined based on the parameter identifying the maximum number of threads that may execute in parallel, and wherein the plurality of threads constitutes a pool of threads in which threads in the pool of threads are reusable;

for each of the processing commands buffered, executing a processing command in one of the plurality of threads, wherein at least two of the plurality of processing commands are executed in parallel using the plurality of threads.

* * * * *